Dec. 5, 1967     H. M. BARRETT     3,356,777
METHOD AND MEANS FOR SEALING LEAKS IN BURIED CONDUITS
Filed Aug. 10, 1964
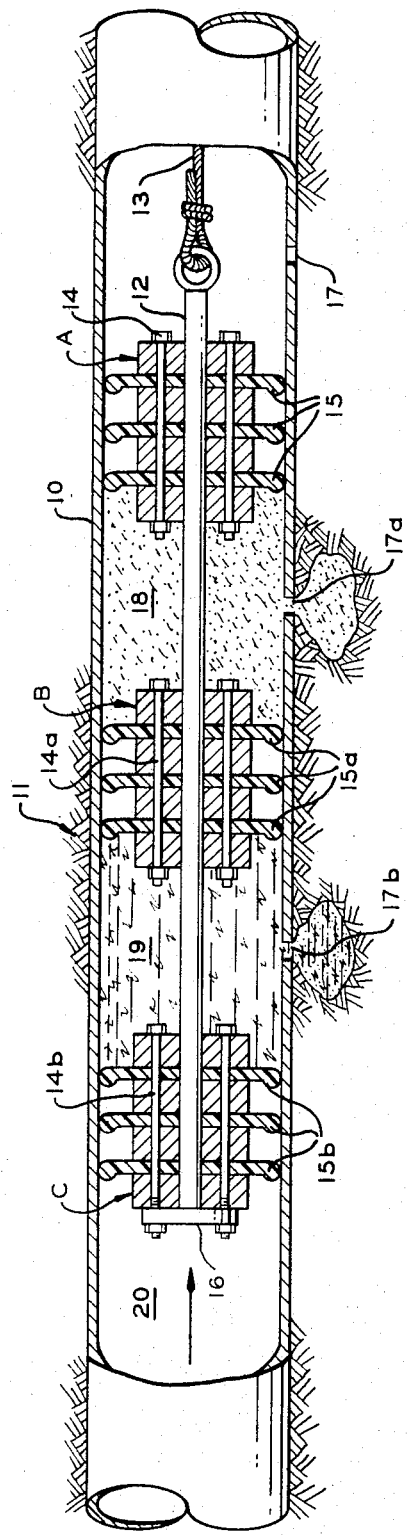
INVENTOR.
H.M. BARRETT
BY *Young and Quigg*
ATTORNEYS

United States Patent Office 3,356,777
Patented Dec. 5, 1967

3,356,777
METHOD AND MEANS FOR SEALING LEAKS IN BURIED CONDUITS
Herbert M. Barrett, Bartlesville, Okla., assignor to Phillips Petroleum Company, a corporation of Delaware
Filed Aug. 10, 1964, Ser. No. 388,580
12 Claims. (Cl. 264—36)

This invention relates to sealing leaks in buried or otherwise inaccessible conduits such as pipe lines. In one aspect the invention relates to a method for introducing a sealing material to an inaccessible leak in a conduit. In another aspect the invention relates to a method for positioning a fluid permeable mat at a leak in a buried conduit and then contacting the mat with a liquid emulsion that contains pliable solids in suspension that will coat and render impermeable the permeable mat.

In many instances conduits such as gas and water pipe lines are buried in the earth and then the surface of the earth over these pipe lines is occupied by streets, buildings, sidewalks and the like, so that it is impossible or impractical to excavate the pipe lines to repair leaks that develop with the passing of time. Attempts to solve this problem have not been satisfactory because the methods employed have been too expensive or have reduced the cross-sectional area of the conduits considerably. Such methods have included forcing a thermoplastic tube through the conduit and using the tube for transporting the fluid. This provides a conduit free from leaks but reduces the flow area of the conduit drastically and results in a considerable increase in velocity of fluid flow in order to transport the required amount of fluid with a resulting increase in pressure drop through the conduit.

It is an object of this invention to provide a method for sealing leaks in a buried conduit. It is also an object of the invention to provide a device for placing the sealing material at the leaks in a buried conduit. It is a further object of this invention to provide a combination of materials that will coact to plug leaks in a buried conduit. A method and means for placing a fluid permeable mat at a leak in a buried conduit and contacting the mat with an emulsion of finely divided plastic solids in a liquid vehicle so that the solids coalesce and form a coating on the mat thus rendering the mat fluid impermeable is a further object of the invention. Other and further objects and advantages of the invention will be apparent to one skilled in the art upon study of the disclosure, including the detailed description of the invention and the appended drawing wherein:

The sole figure is a diagrammatic illustration, in section, of one embodiment of the invention.

In the drawing a conduit 10 is buried in the earth 11. In the conduit 10 a pig comprises a shaft 12 with a line 13 attached to its leading end. Positioned upon the shaft 12 are sealing members A, B and C comprising body members 14, 14a and 14b in slidable relationship with the shaft 12 and flexible cups 15, 15a and 15b which are in sealing contact with the conduit 10. The sealing member C comprising body 14b and cups 15b can be slidable on the shaft 12 or can be retained on said shaft by retainer 16 as shown.

In the space 18 between sealing members A and B is a quantity of aqueous diatomite slurry. In the space 19 between sealing members B and C is a quantity of bituminous emulsion. Leaks in conduit 10 are indicated at 17, 17a and 17b.

As the pig is propelled through the conduit 10 by line 13 or by fluid pressure introduced into conduit 10 at 20, or by a combination of the two, the flexible cups of sealing member A bear against the conduit 10 in sealing relationship and apply pressure on the slurry in space 18 so that slurry is forced out of leaks, as at 17a, into the earthen formation. The sealing member B applies similar pressure on the emulsion in space 19 so that emulsion is forced into contact with the diatomite at leak 17b. Sealing members A and B are free to slide on shaft 12 so that the pressure applied to the slurry is controlled, principally by the flexibility of the cups 15, 15a and 15b. These cups can be fabricated from rubber, fabric or steel reinforced rubber, nylon, polyethylene, polypropylene and the like to provide the desired flexibility. The shaft 12 can be a rigid rod or can be a flexible cable such as a steel cable.

The above-described system is usually preferred if a number of buried conduits are to be treated because the pig removes the material not utilized to plug the leaks. It is possible, however, to practice the invention without using a pig such as that shown in the drawing. A pill or slug of the slurry of diatomite can be pumped through the conduit following a stream of a fluid such as oil. The slug of slurry can then be followed by a slug of oil, which in turn is followed by a slug of the asphalt emulsion. A stream of oil can then be pumped through the conduit to propel the materials through the conduit. The pressure applied to the slugs of slurry and emulsion can be controlled by controlling the pressure drop at the effluent end of the conduit. It may be desirable to follow the slug of emulsion with a pig to remove any deposits of diatomite or asphalt from the interior of the conduit. Although any inert fluid such as air, water or oil can be used to separate the slugs and to propel the slugs through the conduit, oil is preferred because it is insoluble in the slurry and emulsion. The slugs of slurry and emulsion can be also introduced separately, each slug being preceded by and followed by a pig composed of only a single sealing member such as sealing member A, B or C of the drawing.

The method of separating and propelling the slugs of slurry and emulsion through a conduit with a fluid is particularly advantageous in those situations where there are impediments in the conduit such as electrical wires, smaller conduits, orifices and the like which would prohibit the use of a pig. Such method is also useful in gas conduits where deposits of rust and sharp turns in the conduit make use of a pig impossible or impractical.

Broadly, the invention contemplates forming a fluid permeable mat at the leak in a buried conduit and then impregnating the mat with a liquid that will solidify to a fluid impermeable solid. A material particularly suitable for forming the mat is diatomite (diatomaceous earth) and a liquid particularly suitable for solidifying to form a fluid impermeable solid is an emulsion of coal tar pitch or asphalt. Any bituminous emulsion containing cationic, anionic or nonionic emulsifiers or mixtures thereof is applicable to this invention. Attapulgite can be used to form the mat although diatomite is preferred.

A particularly useful class of cationic emulsifying agents which can be so used are salts of organic nitrogen bases characterized by the presence of at least one basic nitrogen atom in their cation portion, and where the latter contains a long-chain aliphatic hydrocarbon radical of at least 12 and as many as 24 carbon atoms, preferably a straight chain fatty aliphatic group. A particularly useful subclass of such cationic emulsifying agents are the tetra-substituted quaternary ammonium compounds, such as those of the general formula:

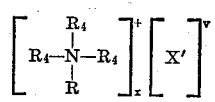

where $R_3$ is a long alkyl chain of at least 12 and as many as 24 carbon atoms, and the $R_4$'s are shorter alkyl radicals or benzyl radicals, the presence of which is sufficient to impart oil solubility and emulsifying properties to the salt material, X' is a hydroxyl or an anion such as nitrate, sulfate, secondary phosphate, acetate, benzoate, salicylate and preferably a halogen, such as chlorine or bromine, $v$ is the valence of said hydroxyl or anion, and $x$ is an integer equal to said valence. Another particularly useful subclass of cationic emulsifying agents are the salts of heterocyclic nitrogen bases, such as alkylpyridine, alkylquinoline, alkylisoquinoline and alkylimidazole, a particularly useful group of the latter being represented by the general formula:

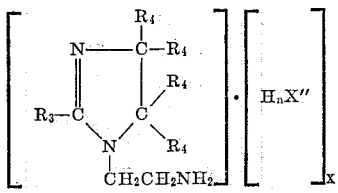

where $R_3$ is an aliphatic radical selected from the group consisting of alkyl and alkenyl radicals, preferably having 12 to 24 carbon atoms, $R_4$ is selected from the group consisting of hydrogen and alkyl radicals preferably having 1 to 4 carbon atoms, and $X''$ is an anion such as nitrate, sulfate, secondary phosphate, acetate, benzoate, salicylate and preferably a halogen, such as chlorine and bromine, $n$ is an integer equal to the valence of said anion, and $x$ is an integer of 1 to 3. Primary, secondary and tertiary monoamines and diamines are also useful in this invention, particularly the fatty acid diamines of the general formula $R_3NH(CH_2)_mNH_2$, where $R_3$ is as defined above in the formula and $m$ is an integer in the range of 1 to 3.

Another particularly useful subclass of cationic emulsifying agents which can be used in combination with the nonionic emulsifying agents (especially where alkaline cationic asphalt emulsions are desired) are those of the general formula:

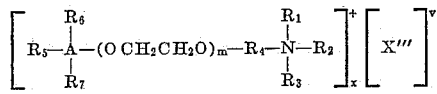

where $R_1$ and $R_2$ are lower alkyl hydrocarbon radicals having, for example, 1 to 3 carbon atoms, such as methyl, ethyl, propyl (preferably methyl), $R_3$ is also such an alkyl radical (preferably methyl) or an aryl, alkaryl or aralkyl hydrocarbon radical having, for example, 6 to 7 carbon atoms, such as phenyl, benzyl or tolyl, $R_4$ is a lower alkylene hydrocarbon radical having, for example 1 to 2 carbon atoms, such as methylene and ethylene, $R_5$ is a long chain alkyl hydrocarbon radical having, for example, 8 to 25, preferably 8 to 20, carbon atoms, such as octyl, dodecyl, pentadecyl, eicosyl and pentacosyl, $R_6$ and $R_7$ are hydrogen atoms or lower alkyl radicals having, for example, 1 to 5 carbon atoms, A is a benzene nucleus, $m$ is 0 or 1, $X'''$ is a hydroxyl or a salt-forming anion such as nitrate, sulfate, secondary phosphate, acetate, benzoate, salicylate and preferably a halogen, such as chlorine or bromine, $v$ is the valence of said hydroxyl or anion, and $x$ is an integer equal to said valence. These cationic emulsifying agents are quaternary ammonium compounds, and I prefer to use those which are chloride salts and where the sum of carbon atoms in $R_1$, $R_2$ and $R_3$ does not exceed 12 and the sum of carbon atoms in $R_6$ and $R_7$ does not exceed 6.

Representative cationic emulsifying agents which can be used in this invention include n-hexadecyltrimethylammonium bromide, n-hexadecyldimethylethylammonium bromide, "tallow" trimethylammonium chloride (the term "tallow" referring to the radical of a mixture of fatty acids derived from tallow), n-dodecyltrimethylammonium chloride,
n-dodecyltrimethylammonium bromide,
n-dodecyltrimethylammonium hydroxide,
n-tetradecyltrimethylammonium chloride,
n-hexadecyltripropylammonium iodide,
n-octadecyltri-n-butylammonium nitrate,
n-octadecyltriethylammonium chloride,
n-hexadecyltrimethylammonium chloride,
n-eicosyltrimethylammonium chloride,
n-tetracosyltrimethylammonium acetate,
n-pentadecylethyldimethylammonium chloride,
n-docosylpropyldimethylammonium chloride,
n-tricosyl-n-decyldiethylammonium benzoate,
n-tetradecyl-n-heptyldimethylammonium chloride,
n-octadecyl-n-decyldimethylammonium chloride,
n-heptadecyldipropylmethylammonium chloride,
n-nonadecyl-di-n-octylmethylammonium chloride,
n-hexadecylethyldimethylammonium chloride,
n-dodecylbenzyldimethylammonium chloride,
n-pentadecylbenzyldiethylammonium fluoride,
n-octadecylpropyldimethylammonium salicylate,
n-dodecyl-n-butylbenzylmethylammonium bromide,
n-nonadecyldiethylmethylammonium sulphate,
n-eicosyltrimethylammonium orthophosphate,
1-(2-aminoethyl)-2-(4-tetradecenyl)-4,5-di-n-butyl-2-imidazoline,
1-(2-aminoethyl)-2-(1,1-diethyl-5,7-dodecadienyl)-4,5-dimethyl-2-imidazoline,
1-(2-aminoethyl)-2-n-octadecyl-4-ethyl-2-imidazoline,
1-(2-aminoethyl)-2-n-eicosyl-2-imidazoline,
1(2-aminoethyl)-2-(1,1-dimethyldecyl)-2-imidazoline,
1-(2-aminoethyl)-2-(1,2-heptadecenyl)-2-imidazoline,
1-(2-aminoethyl)-2-(5,7-heptadecadienyl)-2-imidazoline,
p-n-octylbenzyldimethylphenylammonium chloride,
p-(1,1,3,3-tetramethylbutyl)benzyltrimethylammonium chloride,
4-n-nonyl-3,5-dimethylbenzyldiethylbenzylammonium chloride,
2-n-dodecyl-3-methyl-5-isopentylphenylethylmethyl-n-butyl-p-tolylammonium chloride,
4-(5,6-dimethyl)pentadecyl-3,5-diethylphenylethylmethylphenylammonium chloride,
3-methyl-4-n-eicosyl-5-ethylbenzyltriethylammonium chloride,
3,5-di-n-propyl-4-n-pentacosylphenylethyl-di-n-pentyl-m-tolylammonium chloride,
p-n-octylphenoxyethyloxyethyltrimethylammonium chloride,
p-(3-methyldodecyl)benzyltrimethylammonium chloride,
p-(1,1,3,3-tetramethylbutylphenoxyethoxyethyl-dimethylbenzylammonium chloride,
3,5-dimethyl-4-n-octylphenoxyethoxyethyldiethylphenylammonium chloride,
2-(3,4,5-triethyl)tetradecyl-3,4-diisopropylphenoxyethoxyethylmethyl-n-butyl-o-tolylammonium chloride,
p-(1,1,3,3-tetramethylbutyl)-o-tolyloxyethyoxyethyltrimethylammonium chloride,
3-methyl-5-n-pentyl-4-n-eicosylphenoxyethoxyethyl-di-n-butylphenylammonium chloride,
2-methyl-6-n-amyl-4-n-pentacosylphenoxyethoxyethyl-di-n-amyl-n-tolylammonium chloride, and the like, including mixtures thereof, and the corresponding hydroxides, nitrates, sulfates, phosphates, acetates, benzoates, salicylates, and bromides.

There are a number of commercially available cationic emulsifying agents which can be used in this invention, including: Nalcamine CAE (the preferred cationic emulsifying agent of this invention), which is a mixture of 1-(2-aminoethyl)-2-n-aliphatic-2-imidazolines where the aliphatic groups are heptadecenyl and heptadecadienyl; Hyamine 1622, octylphenoxyethoxyethyldimethylbenzylammonium chloride; Hyamine 2389, methyldodecylbenzyltrimethylammonium chloride; Nalquate G–8–12, 1-(2-oxyethyl)-2-n-alkyl-1 (or 3)-benzyl-2-imidazolinium chloride, Diam 11–C (n-alkyl-1,3-propylenediamine); Aliquat 26, monotallowtrimethylammonium chloride; Alamine 26, primary tallow amine; Duomeen T, N-alkyltrimethylenediamine; and the like.

Representative anionic emulsifying agents which can be used in the invention include alkylaryl sulfonates, such as methylnaphthalene sodium sulfonate (e.g., Petro-Ag), p-dodecylbenzene sodium sulfonate, n- or iso-p-octylphenoxypoly(ethyleneoxy)ethanol sodium sulfonates, isopropylnaphthalene sodium sulfonate (e.g., Aerosol OS), and tetrahydronaphthalene sodium sulfonate (e.g., Alkanol S), sulfates such as n-hexadecyl sodium sulfate, ammonium lauryl sulfate, and tridecyl sodium sulfate, phosphates such as alkylpolyphosphates (e.g., Estranol CP) and complex amido-phospho salts, and esters such as sodium diamyl sulfosuccinate (e.g., Aerosol AY) and disodium-N-octadecylsulfosuccinate (e.g., Aerosol 18), and the like.

Suitable nonionic emulsifying agents applicable for this invention as shown by the general formula:

$$R-O-(C_2H_4O)_x-\left(\begin{array}{c}CH-CH_2-O\\|\\CH_3\end{array}\right)_y-(C_2H_4O)_z-H$$

where R is selected from the group consisting of hydrogen, aryl, and alkaryl radicals; and $x$, $y$ and $z$ are integers, such that (1) when $x$ is zero, $y$ is also zero, $z$ is in the range of 20 to 60, inclusive, and said R is one of said aryl and alkaryl radicals, and (2) when $x$ and $y$ are each greater than zero, the sum of $x$ and $z$ is in the range of 50 to 350, inclusive, and $y$ is in the range of 40 to 60, inclusive, represent a rather narrow class of compounds and they each have a critical balance of a hydrophobic component (propyleneoxy) and a hydrophilic component (ethyleneoxy) which is necessary to prepare asphalt emulsions of this invention. Within the general formula given above for these nonionic emulsifying agents, there are two preferred subclasses which can be represented by the following general formulas:

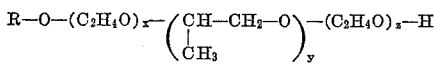

where $R_1$ is selected from the group consisting of hydrogen and alkyl hydrocarbon radicals (each such alkyl radical preferably having 1 to 25 carbon atoms, and the total carbon atoms in the sum of such alkyl radicals preferably not exceeding 25), and $n$ is an integer in the range of 20 to 60, inclusive; and $$R_2-O-(C_2H_4O)_a-\left(\begin{array}{c}CH-CH_2-O\\|\\CH_3\end{array}\right)_b-(C_2H_4O)_c-H$$

where $a$ and $c$ are integers greater than zero and whose sum is in the range of 50 to 350, inclusive, $b$ is an integer in the range of 40 to 60, inclusive, and $R_2$ is selected from the group consisting of hydrogen and the hydrocarbon radical:

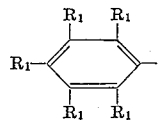

where $R_1$ is as defined above.

Representative examples of the nonionic emulsifying agents which can be used in preparing the novel asphalt emulsions of this invention include:

phenoxynonadeca(ethyleneoxy)ethanol,
phenoxyeicosa(ethyleneoxy)ethanol,
phenoxytricosa(ethyleneoxy)ethanol,
phenoxypentacosa(ethyleneoxy)ethanol,
phenoxyoctacosa(ethyleneoxy)ethanol,
phenoxytriaconta(ethyleneoxy)ethanol,
phenoxyhentriaconta(ethyleneoxy)ethanol,
phenoxydotriaconta(ethyleneoxy)ethanol,
phenoxytetraconta(ethyleneoxy)ethanol,
phenoxypentaconta(ethyleneoxy)ethanol,
phenoxynonapentaconta(ethyleneoxy)ethanol,
4-methylphenoxyeicosa(ethyleneoxy)ethanol,
4-methylphenoxyheneicosa(ethyleneoxy)ethanol,
2,3,6-triethylphenoxydecosa(ethyleneoxy)ethanol,
4-(1,1,3,3-tetramethylbutyl)phenoxytetracosa(ethyleneoxy)ethanol,
4-(1,3,5-trimethylhexyl)phenoxyhexacosa(ethyleneoxy)ethanol,
4-nonylphenoxyheptacosa(ethyleneoxy)ethanol,
2,3,4,5,6-penta-n-pentylphenoxytriaconta(ethyleneoxy)ethanol,
2-(1,3,5-trimethylhexyl)-4-(1,3-dimethylbutyl)phenoxyhentriaconta(ethyleneoxy)ethanol,
4-(3,5,5-trimethylheptyl)phenoxydotriaconta(ethyleneoxy)ethanol,
3-(3,5,7,7-tetramethyl-5-ethylnonyl)phenoxytetraconta(ethyleneoxy)ethanol,
4-(1,1,3,3,5,5,7,7-octamethyldecyl)phenoxypentaconta(ethyleneoxy)ethanol,
4-n-pentacosylphenoxynonapentaconta(ethyleneoxy)ethanol,
3,5-di-n-decyl-4-n-pentylphenoxynonapentaconta(ethyleneoxy)ethanol,
beta-hydroxyethoxytetraconta(propyleneoxy)octatetraconta(ethyleneoxy)ethanol,
beta-hydroxyethoxyoctatetraconta(ethyleneoxy)tetraconta(propyleneoxy)ethanol,
beta-hydroxyethoxypentaconta(ethyleneoxy)pentaconta(propyleneoxy)deca(ethyleneoxy)ethanol,
beta-hydroxyethoxyocta(ethyleneoxy)hexaconta(propyleneoxy)nonaconta(ethyleneoxy)ethanol,
beta-hydroxyethoxyhecta(ethyleneoxy)pentatetraconta(propyleneoxy)hecta(ethyleneoxy)ethanol,
beta-hydroxyethoxydohecta(ethyleneoxy)hexaconta(propyleneoxy)octatetracontahecta(ethyleneoxy)ethanol,
phenoxyethyleneoxypentapentaconta(propyleneoxy)octatetraconta(ethyleneoxy)ethanol,
4-methylphenoxy-1-deca(ethyleneoxy)nonatetraconta(propyleneoxy)pentaconta(ethyleneoxy)ethanol,
4-(1,3,5-trimethylhexyl)phenoxyheptaconta(ethyleneoxy)pentaconta(propyleneoxy)triaconta(ethyleneoxy)ethanol,
4-n-pentacosylphenoxydicta(ethyleneoxy)pentaconta(propyleneoxy)hecta(ethylenoxy)ethanol,
2,4,5-trimethylphenoxypentacontahecta(ethyleneoxy)pentaconta(propyleneoxy)hexaconta(ethyleneoxy)ethanol,
2-(1,3,5-trimethylhexyl)-4-(1,1,3,3-tetramethylbutyl)phenoxyhecta(ethyleneoxy)hexatetraconta(propyleneoxy)dicta(ethyleneoxy)ethanol,
4-n-pentacosylphenoxyhecta(ethyleneoxy)hexaconta(propyleneoxy)nonatetracontadicta(ethyleneoxy)ethanol, and the like, and mixtures thereof.

Many of the nonionic emulsifying agents which can be used in this invention are commercially available, such as Triton X-205, Triton X-305 and Triton X-405, each of which is a mixture of octylphenoxypoly(ethyleneoxy)ethanols with 20, 30 and 40 ethyleneoxy groups in the poly(ethyleneoxy) chain, respectively, and Pluronic P-104, Pluronic P-105 and Pluronic F-108, which are materials having the general formula $$HO(C_2H_4O)_a(C_3H_6O)_b(C_2H_4O)_cH$$

where the sum of $a$ and $c$ is about 50, 74 or 296, respectively, and where $b$ is about 56.

Bitumens which can be employed in the preparation of the emulsions of this invention include any of these bituminous materials used heretofore and known in the prior art, such as coal tar pitch natural asphalts or those derived from petroleum refining, for example, by steam refining and/or air blowing, etc. Paving asphalts characterized by penetrations (ASTM D-5) from 0 to about 30 or even higher, and preferably from about 40–300, and having softening points ASTM D-36-26) in the range of 90° to 250° F., preferably 100° to 150° F., represent suitable asphalts which can be used. Such bituminous materials include coal tar pitch, petroleum asphalts, and the like. Emulsions of coal tar pitch are particularly advantageous for repairing conduits that normally transport liquid hydrocarbons because coal tar pitch is substantially insoluble in liquid hydrocarbons.

The recipes for bituminous emulsions are well known in the art. Such cationic emulsions containing the essention ingredients as well as various additives are described in U.S. Patents 3,026,266 and 3,032,507. A typical cationic asphalt emulsion can be prepared containing by weight 60 parts asphalt, 40 parts water, 0.2 part fatty diamine, 0.5 part acetic acid, and 0.1 part calcium chloride. A coal tar pitch emulsion is similarly prepared. Since most cationic emulsifiers have bactericidal properties, the coating of this invention protects the covered surfaces from bactericidal as well as other types of corrosion. Other bactericides may also be added to the emulsion, if desired. Suitable bactericides are described in U.S. Patent 2,979,377. Also, conventional corrosion inhibitors can be added to the emulsion.

The diatomite slurry of this invention will be a high water loss, aqueous slurry of diatomite (diatomaceous earth) with a sufficient amount of a dispersing or suspending agent to form a stable low viscosity system. Aqueous slurries of diatomite for use as the high water loss slurries of our invention will usually contain from about 20 to 60 pounds of diatomite per barrel of slurry in either fresh or salt water. The slurry can, of course, contain more or less diatomite so long as the slurry is pumpable and contains a sufficient amount of diatomite to form a mat in the earthen formation at the locus of a leak in the buried conduit. Diatomite is also known as diatomaceous earth, infusorial earth, or kieselguhr and is composed of the silicified skeletons of diatoms. Diatomite is abundantly available and relatively inexpensive.

The suspending or dispersing agent for stabilizing the diatomite slurry is preferably asbestos because of its unique ability to suspend diatomite in water and because it has no adverse effect on the high water loss property of the slurry of diatomite in water. Other suspending agents can be used such as colloidal clays including bentonite and attapulgite and organic colloids including carboxymethylcellulose. Bentonite is a good suspending agent in fresh water but reduces the water loss property of the slurry and also raises the viscosity of the slurry. Attapulgite can be used in either fresh or salt water but also has the disadvantage of reducing the water loss and increasing the viscosity of the slurry although to a lesser extent than bentonite. Organic colloids such as carboxymethylcellulose also reduce the water loss properties and increase the viscosity of the diatomite slurry. Attapulgite can be used instead of asbestos in the practice of the present invention but is less desirable than asbestos for the reasons given. Bentonite, organic colloids and other agents that reduce fluid loss of the slurry are not satisfactory for use in the invention.

The asbestos used in the slurries of this invention can be any chrysotile asbestos which will form a pumpable slurry. For reasons of economy asbestos which will pass a U.S. standard 16-mesh screen, or which corresponds to Group 7 according to the Quebec Screen Test adopted by the Quebec Asbestos Producers Association, will often be preferred. A particularly preferred asbestos is California asbestos identified as Coalinga asbestos, obtained from the Johns-Manville Company. The California asbestos has the property of imparting appreciable yield point to an aqueous diatomite slurry with lower viscosity than that obtained with Canadian asbestos so that the diatomite can be satisfactorily suspended with a smaller amount of California asbestos than is possible with other types of chrysotile asbestos such as Canadian chrysotile asbestos. The amount of asbestos employed to stabilize an aqueous slurry of diatomite will generally be in the range of about 2 to 15 pounds of asbestos per barrel of slurry.

The addition of a small amount of lime (calcium hydroxide) to the asbestos-stabilized diatomite slurry will increase the filtration rate of the slurry with only a moderate increase in the viscosity and yield point of the slurry. The amount of lime employed will usually be about 0.5 to 3 pounds of lime per barrel of slurry and will be advantageous when the emulsion employed is a cationic emulsion of asphalt. Asbestos is insensitive to acid and the asbestos-stabilized diatomite slurry can be acidified for use with anionic emulsions of asphalt by use of any acids including mineral acids such as nitric acid, hydrochloric acid, sulfuric acid, phosphoric acid, and the like, as well as organic acids such as acetic acid, benzoic acid, gallic acid, tannic acid, formic acid and the like.

A particularly suitable composition for preparing the high filtration rate slurries of this invention is a mixture of about 40 to 50 parts by weight of diatomite, about 5 parts by weight of asbestos, and about 1 part by weight of lime so that this mixture can be added to water to make a stable high water loss slurry of any desired concentration. Acid can be substituted for the lime to form a composition for making up slurries for use with anionic emulsions of asphalt. The compositions can contain from about 35 to 95 weight percent diatomite with about 5 to 65 weight percent asbestos and sufficient lime or acid component to provide the desired pH of the resultant aqueous slurry. The lime or acid can be added to the water instead of to the solid composition for making up the slurry.

Attapulgite is also relatively insensitive to pH and the pH of an attapulgite-stabilized slurry can also be adjusted to break a cationic or an anionic emulsion of asphalt.

An aqueous slurry of attapulgite displays high water loss characteristics and therefore is a suitable material for forming the high filtration rate slurry for use in the invention. Slurries containing from about 10 to 60 pounds of attapulgite per barrel of water can be used. The amount ordinarily used will be in the range of about 30 to 60 pounds of attapulgite per barrel of slurry although more attapulgite can be used so long as a pumpable slurry results. It will usually be advantageous to add about 2 to 5 pounds of lime (CaOH) per barrel of slurry to retard the yield of viscosity by the attapulgite. The filtration rate of an attapulgite slurry is considerably less than that of a diatomite slurry and therefore attapulgite is less preferred than diatomite.

That which is claimed is:

1. The method of sealing leaks in a buried conduit which comprises passing an aqueous slurry of diatomite, containing a dispersing agent for said diatomite, through said conduit under sufficient pressure to force a portion of said slurry out of said conduit at said leaks so as to form a fluid permeable mat at the locus of the leak; and then passing an aqueous emulsion of a bitumen through said conduit under sufficient pressure to force a portion of said emulsion into contact with the diatomite at said leaks whereby the bitumen of said emulsion seals said leaks.

2. The method of claim 1 wherein the slurry comprises diatomite, an amount of water sufficient to form a pumpable slurry, and an amount of asbestos sufficient to disperse said diatomite in said water.

3. The method of claim 1 wherein the slurry comprises diatomite, an amount of water to form a pumpable slurry, and an amount of attapulgite sufficient to disperse diatomite in said water.

4. The method of claim 1 wherein the slurry comprises attapulgite and an amount of water sufficient to form a pumpable slurry.

5. The method of claim 1 wherein the emulsion is an emulsion of asphalt.

6. The method of claim 1 wherein the emulsion is an emulsion of coal tar pitch.

7. The method of sealing leaks in a conduit buried in the earth which comprises passing an aqueous slurry of diatomite, containing a dispersing agent for said diatomite, through said conduit under a pressure greater than that of the normal use of said conduit so as to force slurry out of said leaks into the earthen formation in which the conduit is buried so as to form a fluid permeable mat in the earthen formation at the locus of the leak; and then passing a bituminous emulsion through said conduit after said slurry under a pressure at least as great as that exerted upon said slurry so as to force emulsion into contact with the diatomite at said leaks whereby the bitumen of the emulsion deposits upon the diatomite and seals the leaks.

8. The method of claim 7 wherein the slurry comprises about 44 pounds of diatomite, 4 pounds of asbestos and 1 pound of lime per barrel of slurry; and the emulsion is a cationic emulsion of asphalt.

9. The method of claim 7 wherein the slurry comprises about 44 pounds of diatomite, and 5 pounds of asbestos per barrel of slurry and the water contains sufficient acid to lower the pH of the slurry to about 3 to 5; and the emulsion is an anionic emulsion of asphalt.

10. The method of claim 7 wherein the slurry comprises about 40 to 50 pounds of diatomite, about 1 pound of lime and about 8 to 10 pounds of attapulgite per barrel of slurry; and the emulsion is a cationic emulsion of asphalt.

11. The method of claim 7 wherein the slurry comprises about 40 to 50 pounds of diatomite, and about 8 to 10 pounds of attapulgite per barrel of slurry and the water contains sufficient mineral acid to lower the pH of the slurry to about 3 to 5; and the emulsion is an anionic emulsion of asphalt.

12. The method of claim 7 wherein the slurry comprises about 20 to 60 pounds of diatomite, about 2 to 15 pounds of asbestos, and about 0.5 to 3 pounds of lime per barrel of slurry; and the emulsion is an emulsion of coal tar pitch.

References Cited

UNITED STATES PATENTS

| | | | |
|---|---|---|---|
| 907,724 | 12/1908 | Boyle | 138—97 X |
| 2,727,832 | 12/1955 | Christenson et al. | 106—284 X |
| 2,804,147 | 8/1957 | Pistole et al. | 138—97 |
| 2,808,852 | 10/1957 | Brant | 138—97 |
| 2,837,122 | 6/1958 | Shaw et al. | 138—97 X |
| 2,851,061 | 9/1958 | Bernard et al. | 138—97 |
| 2,934,806 | 5/1960 | Taylor. | |
| 2,950,702 | 8/1960 | Ferguson et al. | 138—97 X |
| 3,227,572 | 1/1966 | Rundle et al. | 138—97 X |
| 3,272,894 | 9/1966 | Roach | 264—36 |
| 3,276,887 | 10/1966 | Pitchford | 106—277 |

FOREIGN PATENTS

| | | |
|---|---|---|
| 149,058 | 8/1920 | Great Britain. |

ROBERT F. WHITE, *Primary Examiner.*

LAVERNE D. GEIGER, *Examiner.*

T. L. MOORHEAD, T. J. CARVIS,
*Assistant Examiners.*